(12) United States Patent
Dubiel

(10) Patent No.: US 11,680,607 B2
(45) Date of Patent: Jun. 20, 2023

(54) SHAFT AND HUB CONNECTION ASSEMBLY

(71) Applicant: Neapco Intellectual Property Holdings, LLC, Farmington Hills, MI (US)

(72) Inventor: Nick Dubiel, Fenton, MI (US)

(73) Assignee: NEAPCO INTELLECTUAL PROPERTY HOLDINGS, LLC, Farmington Hills, MI (US)

( * ) Notice: Subject to any disclaimer, the term of this patent is extended or adjusted under 35 U.S.C. 154(b) by 85 days.

(21) Appl. No.: 17/411,388

(22) Filed: Aug. 25, 2021

(65) Prior Publication Data

US 2022/0065303 A1    Mar. 3, 2022

Related U.S. Application Data

(60) Provisional application No. 63/071,741, filed on Aug. 28, 2020.

(51) Int. Cl.
| | |
|---|---|
| *F16D 1/076* | (2006.01) |
| *F16D 1/10* | (2006.01) |
| *F16D 1/112* | (2006.01) |

(52) U.S. Cl.
CPC .............. *F16D 1/076* (2013.01); *F16D 1/112* (2013.01); *F16D 2001/102* (2013.01)

(58) Field of Classification Search
CPC .... F16B 2200/509; F16D 1/033; F16D 1/076; F16D 1/092; F16D 2001/102; F16D 2003/22326; F16D 2300/08; Y10T 403/648

USPC .......................................... 464/182; 403/348
See application file for complete search history.

(56) References Cited

U.S. PATENT DOCUMENTS

| | | | | |
|---|---|---|---|---|
| 4,838,832 | A | * 6/1989 | Schmitt ..................... | F16D 1/06 |
| | | | | 403/359.6 |
| 5,085,129 | A | * 2/1992 | Dugan .................... | F16D 1/076 |
| | | | | 403/338 |
| 6,702,508 | B2 | 3/2004 | Simons et al. | |
| 8,075,218 | B2 | 12/2011 | Kroener | |

(Continued)

FOREIGN PATENT DOCUMENTS

| | | | | |
|---|---|---|---|---|
| DE | 19645880 A1 | * 5/1997 | ............. | F16D 1/076 |
| DE | 102013208163 A1 | * 11/2014 | ............. | F16D 1/076 |

(Continued)

*Primary Examiner* — Josh Skroupa
(74) *Attorney, Agent, or Firm* — Dickinson Wright PLLC

(57) ABSTRACT

A shaft and hub connection assembly including a shaft and a hub each extending along and rotatable about an axis. One of the shaft and the hub defines a male connection portion, and the other of the shaft and the hub defines a female connection portion. The female connection portion has a radially inner surface comprised of a plurality of inside faces. The male connection portion has a radially outer surface comprised of a plurality of outside faces that nest within the inside faces. A plurality of outside transition regions are located between the outside faces in a circumferential direction and are blended at an outside radius. A plurality of inside transition regions are located between the inside faces of the female connection portion in the circumferential direction and are blended at an inside radius. A gap is provided between the outside and inside transition regions.

16 Claims, 5 Drawing Sheets

(56) References Cited

U.S. PATENT DOCUMENTS

| | | | |
|---|---|---|---|
| 8,123,524 B2 * | 2/2012 | Anitua Aldecoa | A61C 8/0066 |
| | | | 433/173 |
| 9,387,544 B2 * | 7/2016 | Phebus | F16D 1/10 |
| 9,732,802 B2 * | 8/2017 | Griffiths | F16D 1/06 |
| 11,359,675 B2 * | 6/2022 | Kochsiek | F16D 1/10 |
| 2003/0108384 A1 | 6/2003 | Huang et al. | |
| 2021/0131497 A1 * | 5/2021 | Wheeler | F16D 1/112 |

FOREIGN PATENT DOCUMENTS

| | | | | |
|---|---|---|---|---|
| DE | 19645880 B4 * | 2/2016 | | F16D 1/076 |
| WO | WO-2006002463 A1 * | 1/2006 | | F16D 1/09 |

* cited by examiner

SHAFT AND HUB CONNECTION ASSEMBLY

CROSS-REFERENCE TO RELATED APPLICATIONS

This application claims the benefit of U.S. Provisional Patent Application Ser. No. 63/071,741, filed on Aug. 28, 2020, the entire disclosure of which is hereby incorporated by reference in its entirety.

TECHNICAL FIELD

The subject disclosure relates to a shaft and hub connection assembly for transmitting torque. More particularly, the subject disclosure relates to a shaft and hub connection assembly including connection components of the shaft and hub, respectively, that provide a simple and effective connection between the shaft and hub and are easy and inexpensive to fabricate.

BACKGROUND OF THE DISCLOSURE

Shaft and hub connection assemblies for transmitting torque are known in the art. For example, one-piece half shaft constant velocity joint assemblies typically have an externally splined shaft portion that is integrally connected to a hub portion such as an outer race or tulip housing. The externally splined shaft portion typically directly engages a differential gear within an axle or transaxle differential assembly. The externally splined shaft portion also typically contains a sealing journal to engage a seal on the axle or transaxle housing, which allows lubrication fluid to be introduced into the axle or transaxle assembly once the half shafts have been installed. However, a number of issues arise with such constant velocity joint assemblies. For example, constant velocity joints and tripod (tulip) joints require special adaptations for connection to a wide range of axle and transaxle interfaces, which include variations on shaft length, spline geometry, and seal interfaces. This results in high manufacturing and development costs. Additionally, common half shaft constant velocity joints with integral splined shaft portions prevent the axle or transaxle assembly from being filled with lubrication until vehicle assembly because the axle/transaxle is not sealed until the half shafts are installed. Lubrication fill during vehicle assembly is not desired because it requires additional infrastructure and costs to access fill points within the vehicle assembly, and special controls are needed to ensure the correct lubrication is introduced due to the wide range of lubricants and fluids used at vehicle assembly plants. Further, common half shaft constant velocity joints with integral splined shaft portions may damage axle or transaxle housing seals when the externally splined portion of the half shaft is installed into the axle or transaxle during vehicle assembly.

Shaft and hub assemblies with mechanical connections located outside of the axle or transaxle assembly are known for allowing vehicle assembly to occur without disturbing axle/transaxle housing seals. For example, U.S. Pat. No. 8,075,218 by Applicant discloses a shaft and hub connection assembly that includes a shaft presenting a polygonal shaped male connection portion, and a hub defining a female connection portion for receiving and being coupled with the male connection portion. The male connection portion has a radially outer surface having a plurality of outside faces, and the female connection portion has a radially inner surface having a plurality of inside faces. The outside faces are nested within the inside faces for coupling the male and female connection portions to one another. The male and female connection portions include certain geometric features such as a non-constant cone angle and corner radii for self-locking the male and female connection portions and for preventing rotational lash. However, these geometric features have been found to be relatively complex and thus difficult and expensive to reliably mass produce.

Accordingly, there remains a need for improvements to shaft and hub connection assemblies that provide a mechanical connection outside of an axle or transaxle assembly that provide more simple and reliable connections.

SUMMARY OF THE INVENTION

A shaft and hub connection assembly for transmitting torque comprises a shaft extending along and rotatable about an axis and terminating axially at a shaft end. A hub extends along and is rotatable about the axis and terminates axially at a hub end. One of the shaft end of the shaft and the hub end of the hub defines a male connection portion, and the other of the shaft end of the shaft and the hub end of the hub defines a female connection portion for receiving and being coupled with the male connection portion. The female connection portion has a radially inner surface defined by a plurality of inside faces. The male connection portion has a radially outer surface defined by a plurality of outside faces that are removably nested within the plurality of inside faces for coupling the male and female connection portions to one another. The radially outer surface of the male connection portion has a plurality of outside transition regions, with each one of the plurality of outside transition regions disposed between and interconnecting adjacent ones of the plurality of outside faces in a circumferential direction along an outside radius. A plurality of inside transition regions are located between the inside faces of the female connection portion in the circumferential direction. The inside transition regions are blended at an inside radius; and a first gap defined between adjacent ones of the plurality of outside and inside transition regions for providing tolerances in the radial direction during fabrication of the male and female components.

The shaft and hub connection provides a modular external connection that is reliable, simple and inexpensive to manufacture. More particularly, the overlying outside and inside faces provide a large surface contact area between the male and female connection components, thus providing a reliable torque transmitting connection between the shaft and hub, while the gap between the outside and inside transitional regions provides tolerances in the radial direction during fabrication of the male and female components, thus providing a reliable contact pattern between the male and female connection portions that does not drastically change with given geometric errors, thereby providing enhanced durability. Additionally, the arrangement of the overlying outside and inside faces and gap between the outside and inside transitional regions does not require special equipment to fabricate and allows for simple dimensional inspections, thus permitting frequent quality control checks.

According to another aspect of the disclosure, another arrangement of a shaft and hub connection assembly for transmitting torque comprises a shaft extending along and rotatable about an axis and terminating axially at a shaft end. A hub extends along and is rotatable about the axis and terminates axially at a hub end. One of the shaft end of the shaft and the hub end of the hub defines a male connection portion, and the other of the shaft end of the shaft and the hub end of the hub defines a female connection portion for receiving and being coupled with the male connection portion. The female connection portion has a radially inner surface defined by a plurality of inside faces. The male connection portion has a radially outer surface defined by a plurality of outside faces and removably nested within the plurality of inside faces for coupling the male and female connection portions to one another. Each of the plurality of outside faces of the male connection portion is concave or convex shaped along a first circumferential radius, and each of the plurality of inside faces of the female connection portion is concave or convex shaped along a second circumferential radius that is substantially the same as the first circumferential radius.

The arrangement of the first and second circumferential radii being substantially the same as one another provides consistent and reliable contact and torque transfer between the male and female components during rotation thereof while also being simple and inexpensive to manufacture.

According to another aspect of the disclosure, another shaft and hub connection assembly for transmitting torque comprises a shaft extending along and rotatable about an axis and terminating axially at a shaft end. A hub extends along and is rotatable about the axis and terminates axially at a hub end. One of the shaft end of the shaft and the hub end of the hub defines a male connection portion, and the other of the shaft end of the shaft and the hub end of the hub defines a female connection portion for receiving and being coupled with the male connection portion. The female connection portion has a radially inner surface defined by a plurality of inside faces. The male connection portion has a radially outer surface defined by a plurality of outside faces and nested within the plurality of inside faces for coupling the male and female connection portions to one another. A first flange extends outwardly from the shaft in spaced relationship with the shaft end. A second flange extends from the hub adjacent to the hub end and is positioned in abutting axially end-to-end relationship with the first flange. A first axial radius is defined between the first flange and one of the radially outer and inner surfaces, a second axial radius is defined between the second flange and the other of the radially outer and inner surfaces, and a gap is defined between the first axial radius and the second axial radius such that all contact between the male and female connection portions occurs along the outside and inside faces.

The arrangement of the first radius of curvature being larger than the second radius of curvature further ensures that all contact between the male and female connection portions occurs along the outside and inside faces, and further provides tolerances during fabrication of the male and female connection portions, ensuring that manufacturing of the assembly is simple, inexpensive and produces reliable components.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENTS

Referring to the Figures, wherein like numerals indicate correspond parts throughout the several views, a shaft and hub connection assembly 10 is provided for transmitting torque, such as in automobile drivelines. The shaft and hub connection assembly 10 can be incorporated into various torque transmitting devices including half shafts, propeller shafts, transmissions, wheel hubs, electric motors and axle interfaces.

Figure 1:
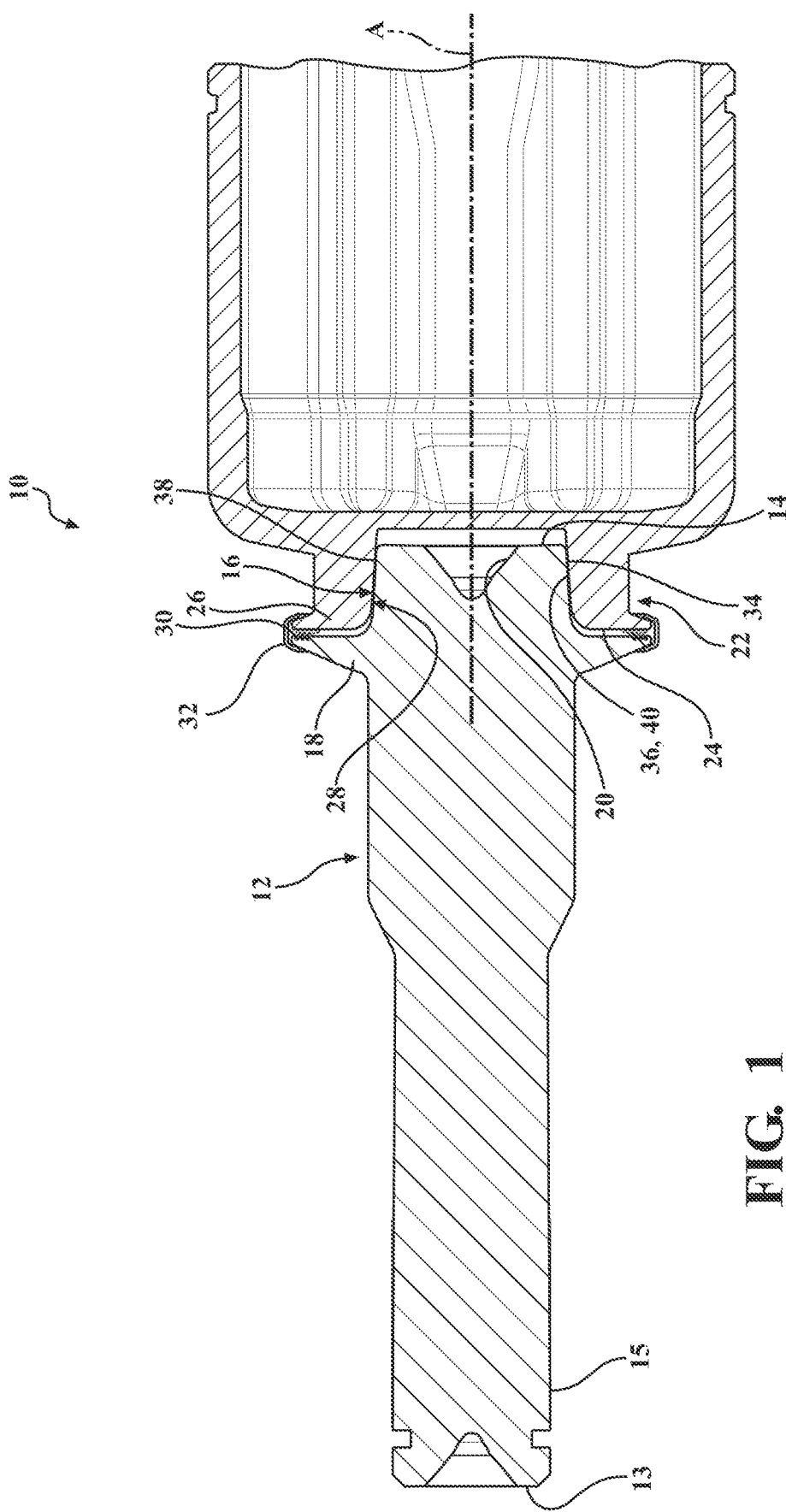
FIG. 1 is a side cross-sectional view of a shaft and hub connection assembly.

As best shown in FIG. 1, the shaft and hub connection assembly 10 includes a shaft 12 that extends along, and is rotatable about an axis A between a proximal end 13 and a distal end (shaft end) 14. A plurality of splines 15 may be formed at the proximal end. A male connection portion 16 is defined adjacent to the distal end 14. A first flange 18 extends outwardly from the shaft 12 adjacent to the male connection portion 16 in spaced relationship with the distal end 14 and extends annularly about the shaft 12. The distal end 14 defines an indentation 20 extending axially therein along the axis A. The indentation 20 is used during a rolling operation of the splines 15 as a centering feature, and may provide a common interface between a standard halfshaft IC shaft which is splined on both ends and has a polygonal design. It also improves material flow in dies when polygonal faces 38 of the male connection portion 16 (discussed in further detail below) are formed, and offers mass savings.

A hub 22 extends along and is rotatable about the axis A and terminates axially at a terminal end (hub end) 24. The hub 22 presents a second flange 26 at the terminal end 24 for being positioned in abutting axially end-to-end relationship with the male connection portion 16 of the shaft 12. The hub 22 defines a female connection portion 28 at the terminal end 24 preferably in the form of a pocket 28 for receiving and being coupled to the male connection portion 16 to allow torque to be transmitted between the shaft 12 and hub 22. It should be appreciated that the male connection portion 16 could alternatively be located on the hub 22 and the female connection component 28 could be located on the shaft 12 without departing from the scope of the subject disclosure.

Figure 2:
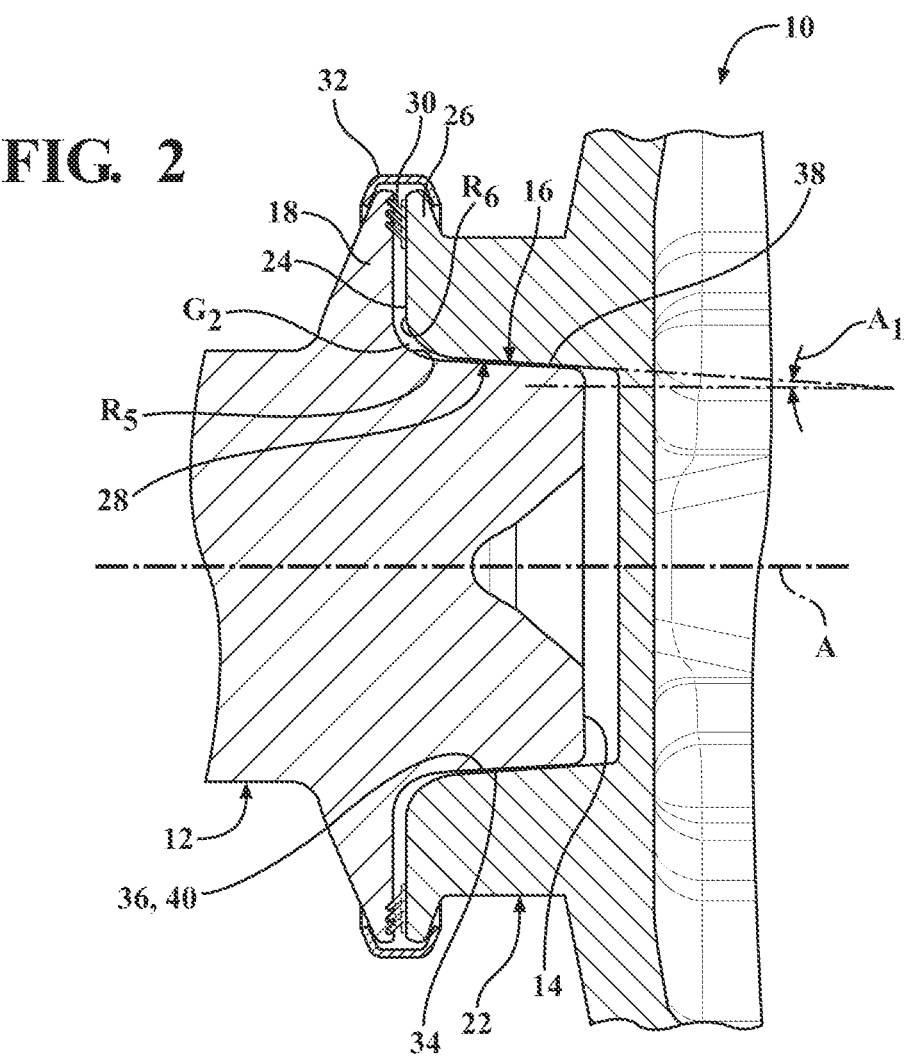
FIG. 2 is a magnified side cross-sectional view of male and female connection portions of the shaft and hub connection assembly of FIG. 1.

As best shown in FIG. 2, a seal 30 is disposed axially between the first and second flanges 18, 26 for preventing fluids from passing between the first and second flanges 18, 26. A fixing mechanism 32, preferably in the form of a clamp 32, fixes and preloads the first and second flanges 18, 26 toward one another. However, other fixing mechanisms could be employed such as a threaded portion and nut/bolt.

The male connection portion 16 has a generally polygonal-shaped radially outer surface 34 (FIGS. 4B, 4C, 5), and the female connection portion 28 has a generally polygonal-shaped radially inner surface 36 (FIGS. 3B, 3C and 5), with the male and female connecting portions 16, 28 being generally the same size and shape as one another such that the male connection portion 16 nests within the female connection portion 28 in order to transmit torque therebetween. The polygonal shape in this instance is defined along a plane that extends transversely through the axis A. The radially outer surface 34 presents a plurality of outside faces 38 and the radially inner surface 36 presents a plurality of substantially corresponding inside faces 40 in order to provide the nesting relationship between the male and female connection portions 16, 28. According to the example embodiment, six outside faces 38 and six inside faces 40 are provided, however, more or fewer outside and inside faces 38, 40, at various lengths and angles could be provided to suit specific design requirements without departing from the scope of the subject disclosure. As will be discussed in further detail immediately below, as used herein the term "polygonal" does not require flat/planar outside and inside faces 38, 40. Rather, they are preferably slightly curved or include other minor imperfections.

Figure 3A:
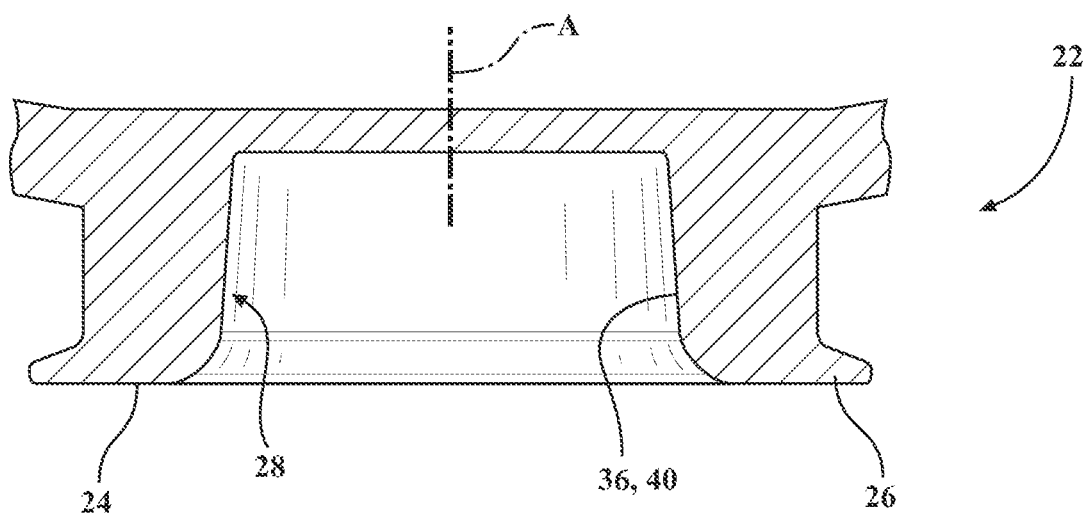
FIG. 3A is a side cross-sectional view of the female connection portion.
Figure 3B:
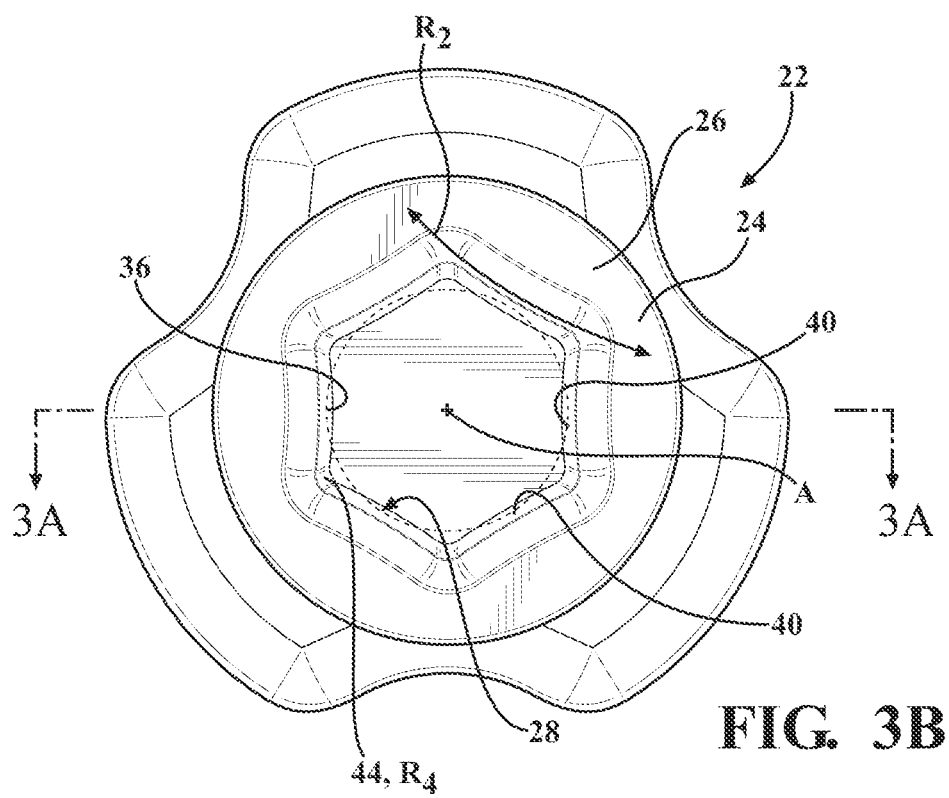
FIG. 3B is front view of the female connection portion.
Figure 3C:
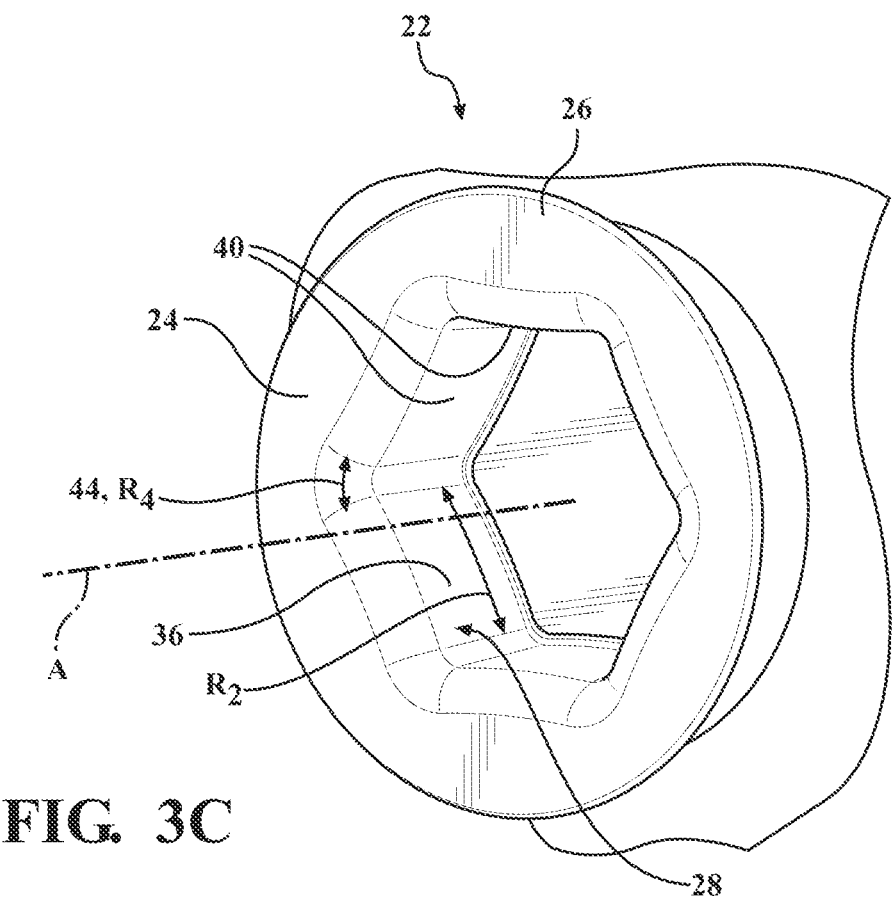
FIG. 3C is a perspective view of the female connection portion.
Figure 4A:
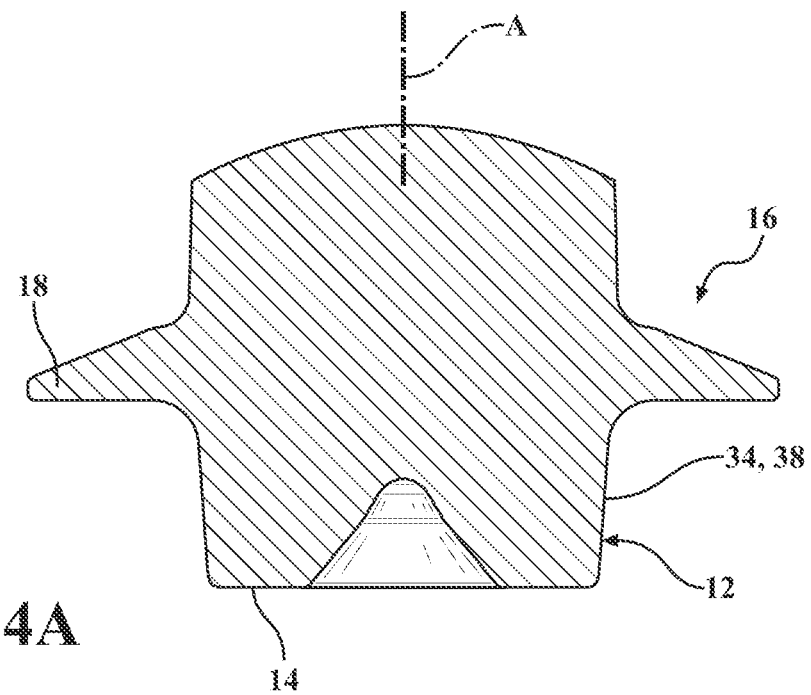
FIG. 4A is a side cross-sectional view of the male connection portion.
Figure 4B:
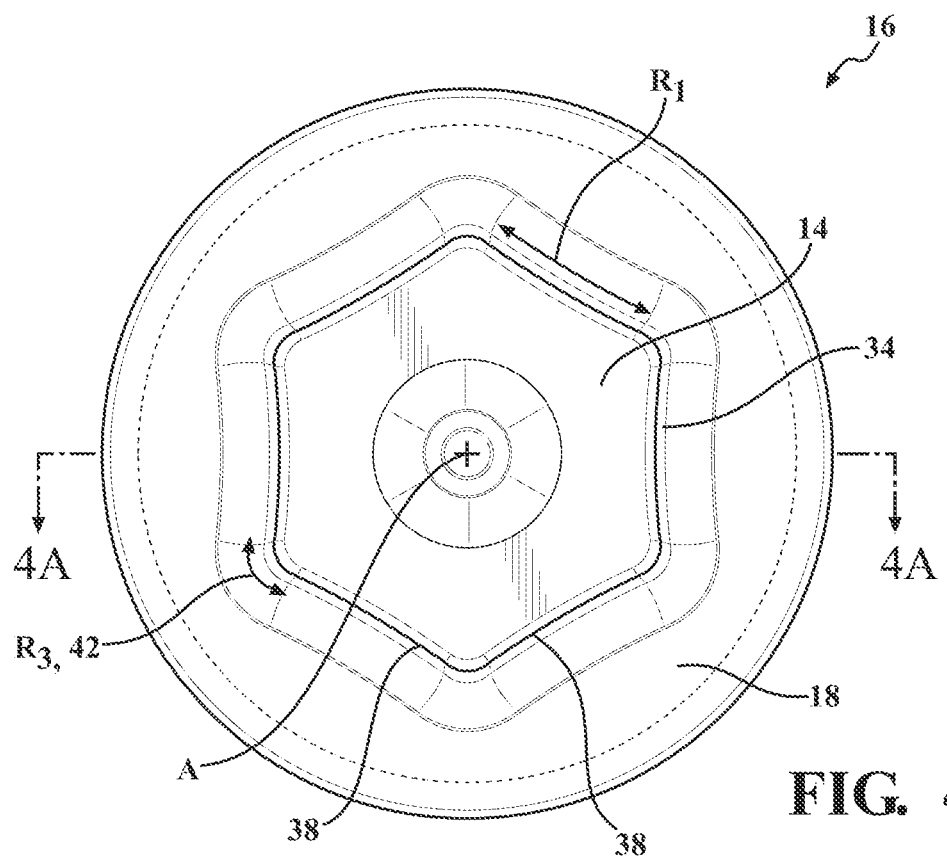
FIG. 4B is front view of the male connection portion.
Figure 4C:
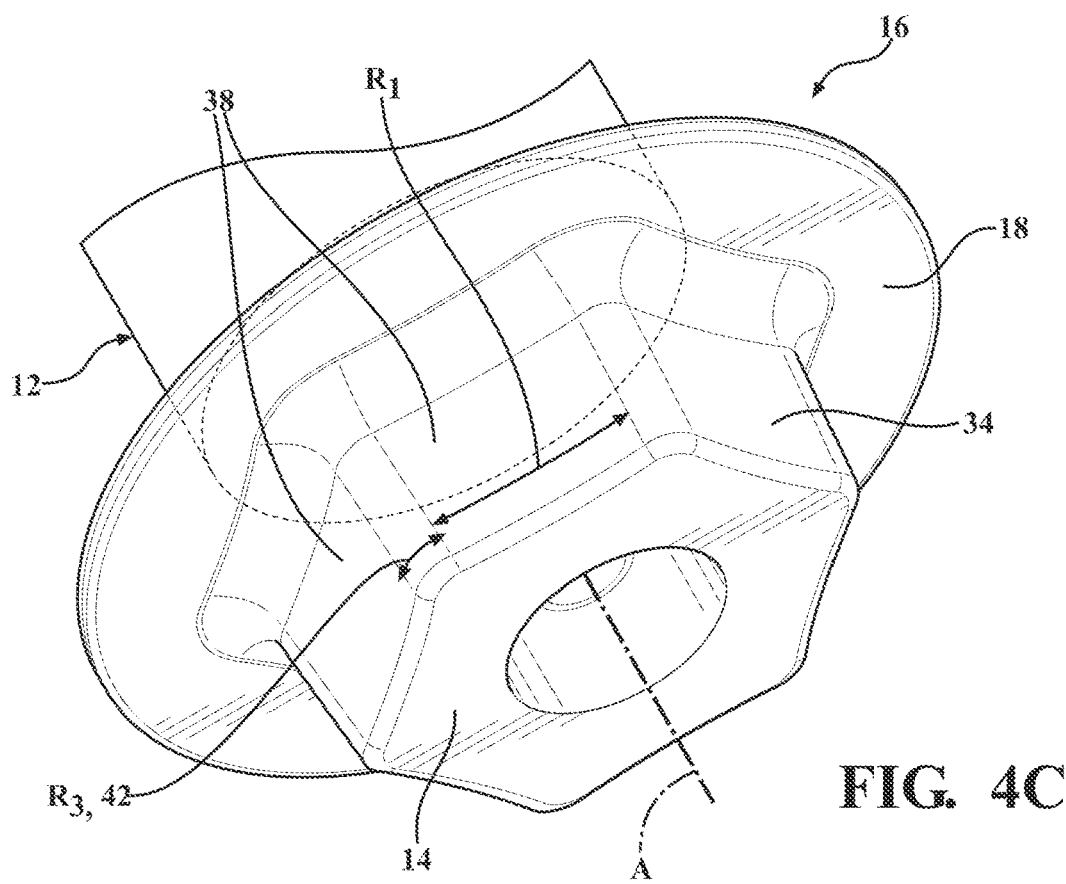
FIG. 4C is a perspective view of the male connection portion.

As best shown in FIG. 4C, the outside faces 38 of the male connection portion 16 each are slightly concaved in a circumferential direction at a first circumferential radius R1. Correspondingly, as best shown in FIGS. 3B-3C, the inside faces 40 of the female connection portion 28 are slightly convex in shape at a second circumferential radius R2 in the circumferential direction. The first and second circumferential radii R1, R2 are substantially the same as one another to provide consistent contact and torque transfer between the male and female components 16, 28 during rotation thereof. It should be appreciated that alternatively, the outside faces 38 could be convex shaped while the inside faces 40 could be concave shaped without departing from the scope of the subject disclosure.

As best shown in FIG. 2, the outside faces 38 of the male connection portion 16 taper radially inwardly axially between the first flange 18 to the distal end 14 at a first angle A1. Similarly, the inside faces 40 of the female connection portion 28 taper radially inwardly as they extend axially away from the terminal end 24 substantially at the first angle A1 such that axially driving the male connection portion 16 into the female connection portion 28 wedges the male connection portion 16 into the female connection portion 28, thereby tightening the connection between the outside and inside faces 38, 40. This tapering arrangement of the outside and inside faces 38, 40 provides a self-centering and backlash free coupling between the male and female connection portions 16, 28.

Figure 5:
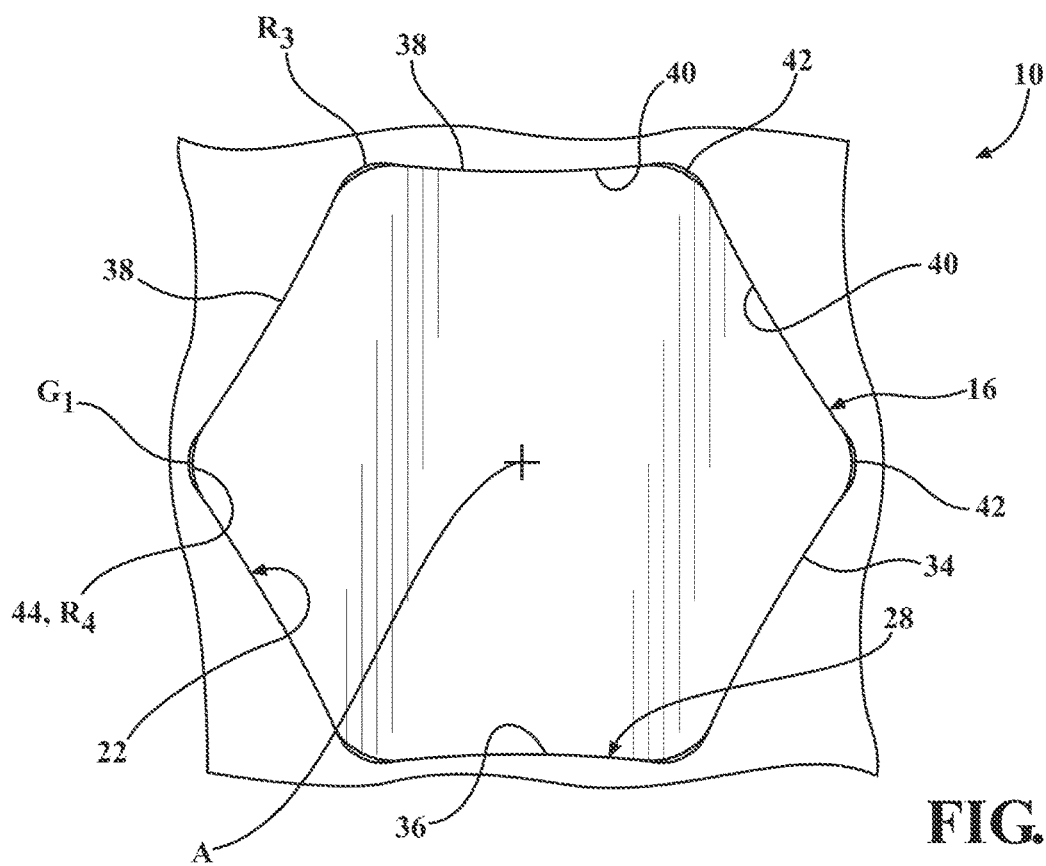
FIG. 5 is a front cross-sectional view of the male and female connection portions.

As best shown in FIGS. 4C and 5, a plurality of outside transition regions 42 are each located at the junction between adjacent outside faces 38 of the male connection portion 16 in the circumferential direction to interconnect the adjacent outside faces 38. The outside transition regions 42 are each blended at an outside radius R3. Similarly, with reference to FIGS. 3B-3C and 5, a plurality of inside transition regions 44 are each located at the junction between adjacent inside faces 40 of the female connection portions 28 in the circumferential direction to interconnect the adjacent inside faces 40. The inside transition regions 44 are each blended at an inside radius R4. As shown in FIG. 5, a gap G1 is located radially between the outside and inside transition regions 42, 44. As shown, the gap G1 may be provided by the outside radius R3 being slightly larger than the inside radius R4 to define the gap G1 therebetween. The gap G1 helps to ensure that all contact between the male and female connection portions 16, 28 occurs along the outside and inside faces 38, 40, versus along the outside and inside transition regions 42, 44, thus avoiding issues commonly associated with corner contact, e.g., material yield and sloppy contact. This allows greater tolerances during fabrication of the male and female connection portions 16, 28 because flexibility is provided in the radial direction between the outside and inside transition regions 42, 44. In other words, the thickness of the gap G1 may vary during fabrication without impacting performance of the joint. Interconnecting, i.e., blending, the outside and inside transition regions 42, 44 also reduces stress concentrations in the inside transition regions 44 of the female connection portion 28 and allows a larger amount of torque to be transmitted between the male and female connection portions 16, 28 of any given size.

As best shown in FIG. 2, the male connection portion 16 has a first axial radius R5 defined between the first flange 18 and each radially outer surface 34. Similarly, the female connection component 28 has a second axial radius R6 defined between the second flange 26 and each radially inner surface 36. A gap G2 is defined in the axial direction between the first and second axial radii R5, R6 to further ensure that all contact between the male and female connection portions 16, 28 occurs along the outside and inside faces 38, 40 and to further provide tolerances during fabrication of the male and female connection portions 16, 28. The gap G2 may be provided by the first axial radius R5 being larger than the second axial radius R6 to define the gap therebetween.

In view of the foregoing, in constant velocity joint applications, the shaft and hub connection assembly 10 allows the constant velocity joint connection to be separated from the axle/transaxle differential gear connections and housing seals in order to avoid the disadvantages noted above with prior art connection assemblies. Furthermore, the subject shaft and hub connection assembly 10 provides a modular external connection that is reliable, simple in design and easy to manufacture. More particularly, the male and female connecting portions 16, 28 are configured to only provide surface contact along the outside and inside face 38, 40 due to the arrangement of the matching first and second circumferential radii R1, R2, the axially tapering first angle A1, the unmatched outside and inside radii R3, R4 and unmatched first and second axial radii R5, R6. This allows the contact pattern between the outside and inside faces 28, 40 to not change much with given geometric errors during fabrication, thus allowing increased durability of the connection assembly 10. Furthermore, greater tolerances are provided in fabricating the male and female connecting portions 16, 28 while still providing a good connection between the male and female connecting portions 16, 28. Moreover, the outside and inside faces 38, 40, the first and second circumferential radii R1, R2, the axially tapering angle A, the unmatched outside and inside radii R3, R4 and unmatched first and second axial radii R5, R6 are simple in design and thus don't require specialized tools to machine, and are easy to check from a quality control standpoint to ensure accurate manufacturing. Additionally, the overlying tapered arrangement of the outside and inside faces 28, 40, provides self-centering and prevents backlash during operation.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. It should be appreciated that the term "substantially" as used herein allows for minor variations/imperfections.

What is claimed is:

1. A shaft and hub connection assembly for transmitting torque, comprising:

a shaft extending along and rotatable about an axis and terminating axially at a shaft end;
a hub extending along and rotatable about the axis and terminating axially at a hub end;
a first flange extending outwardly from the shaft in spaced relationship with the shaft end and extending annularly about the shaft;
a second flange extending from the hub adjacent to the hub end and positioned in abutting axially end-to-end relationship with the first flange;
a fixing mechanism engaged with and biasing the first and second flanges toward one another;
one of the shaft end of the shaft and the hub end of the hub defining a male connection portion, and the other of the shaft end of the shaft and the hub end of the hub defining a female connection portion for receiving and being coupled with the male connection portion;
the female connection portion having a radially inner surface defined by a plurality of inside faces;
the male connection portion having a radially outer surface defined by a plurality of outside faces nested within the plurality of inside faces for coupling the male and female connection portions to one another;
the radially outer surface of the male connection portion having a plurality of outside transition regions with each one of the plurality of outside transition regions disposed between and interconnecting adjacent ones of the plurality of outside faces in a circumferential direction along an outside radius, and the radially inner surface of the female connection portion having a plurality of inside transition regions with each one of the plurality of inside transition regions disposed between and interconnecting adjacent ones of the plurality of the inside faces in the circumferential direction along an inside radius; and
a first gap defined between adjacent ones of the plurality of outside and inside transition regions for providing tolerances in the radial direction during fabrication of the male and female components.

2. The shaft and hub connection assembly as set forth in claim 1, wherein the outside radius is larger than the inside radius to define the gap between the outside and inside transition regions.

3. The shaft and hub connection assembly as set forth in claim 1 wherein the outside faces of the male connection portion are concave along a first circumferential radius, and wherein the inside faces of the female connection portion are convex along a second circumferential radius that is substantially the same as the first circumferential radius.

4. The shaft and hub connection assembly as set forth in claim 1, further comprising:
a first axial radius defined between the first flange and one of the radially outer and inner surfaces, and a second axial radius defined between the second flange and the other of the radially outer and inner surfaces; and
a second gap defined between the first axial radius and the second axial radius such that all contact between the male and female connection portions occurs along the outside and inside faces.

5. The shaft and hub connection assembly as set forth in claim 4, further comprising a seal disposed axially between the first and second flanges for preventing fluid from passing between the first and second flanges.

6. The shaft and hub assembly as set forth in claim 1, wherein the fixing mechanism is a clamp.

7. The shaft and hub connection assembly as set forth in claim 1, wherein the outside and inside faces each taper radially inwardly such that axially moving the male connection portion into the female connection portion wedges the male connection portion into the female connection portion.

8. The shaft and hub connection assembly as set forth in claim 1, wherein the shaft end of the shaft defines an indentation extending axially into the shaft.

9. The shaft and hub connection assembly as set forth in claim 1, wherein each of the radially outer surface of the male connection portion and the radially inner surface of the female connection portion have a generally polygonal shape.

10. The shaft and hub connection assembly as set forth in claim 9, wherein the plurality of outside faces of the radially outer surface is comprised of six outside faces, and wherein the plurality of inner faces of the radially inner surface is comprised of six inside faces.

11. A shaft and hub connection assembly for transmitting torque, comprising:
a shaft extending along and rotatable about an axis and terminating axially at a shaft end;
a hub extending along and rotatable about the axis and terminating axially at a hub end;
one of the shaft end of the shaft and the hub end of the hub defining a male connection portion, and the other of the shaft end of the shaft and the hub end of the hub defining a female connection portion for receiving and being coupled with the male connection portion;
the female connection portion having a radially inner surface defined by a plurality of inside faces;
the male connection portion having a radially outer surface defined by a plurality of outside faces and nested within the plurality of inside faces for coupling the male and female connection portions to one another;
a first flange extending outwardly from the shaft in spaced relationship with the shaft end;
a second flange extending from the hub adjacent to the hub end and positioned in abutting axially end-to-end relationship with the first flange;
wherein a first axial radius is defined between the first flange and one of the radially outer and inner surfaces, a second axial radius is defined between the second flange and the other of the radially outer and inner surfaces, and a gap is defined between the first axial radius and the second axial radius such that all contact between the male and female connection portions occurs along the outside and inside faces.

12. The shaft and hub connection assembly for as set forth in claim 11,
wherein each of the plurality of outside faces of the male connection portion being concave or convex shaped along a first circumferential radius and each of the plurality of inside faces of the female connection portion being concave or convex shaped along a second circumferential radius being substantially the same as the first circumferential radius.

13. The shaft and hub connection assembly as set forth in claim 12, wherein the shaft end of the shaft defines an indentation extending axially into the shaft.

14. The shaft and hub connection assembly as set forth in claim 11, wherein the first axial radius is larger than the second axial radius of to define the gap.

15. The shaft and hub connection assembly as set forth in claim 11, wherein the radially outer surface of the male connection portion has a plurality of outside transition regions with each one of the plurality of outside transition regions disposed between and interconnecting adjacent ones of the plurality of outside faces in a circumferential direction along an outside radius, wherein the radially inner surface of the female connection portion has a plurality of inside transition regions with each one of the plurality of inside transition regions disposed between and interconnecting adjacent ones of the plurality of the inside faces in the circumferential direction at an inside radius, and wherein a first gap is defined between adjacent ones of the plurality of outside and inside transition regions for providing tolerances in the radial direction during fabrication of the male and female components.

16. The shaft and hub connection assembly as set forth in claim 11, wherein the outside and inside faces each taper radially inwardly such that axially moving the male connection portion into the female connection portion wedges the male connection portion into the female connection portion.

\* \* \* \* \*